L. C. MADSEN.
AUTOTRUCK FENDER.
APPLICATION FILED FEB. 1, 1915.
1,228,461.
Patented June 5, 1917.
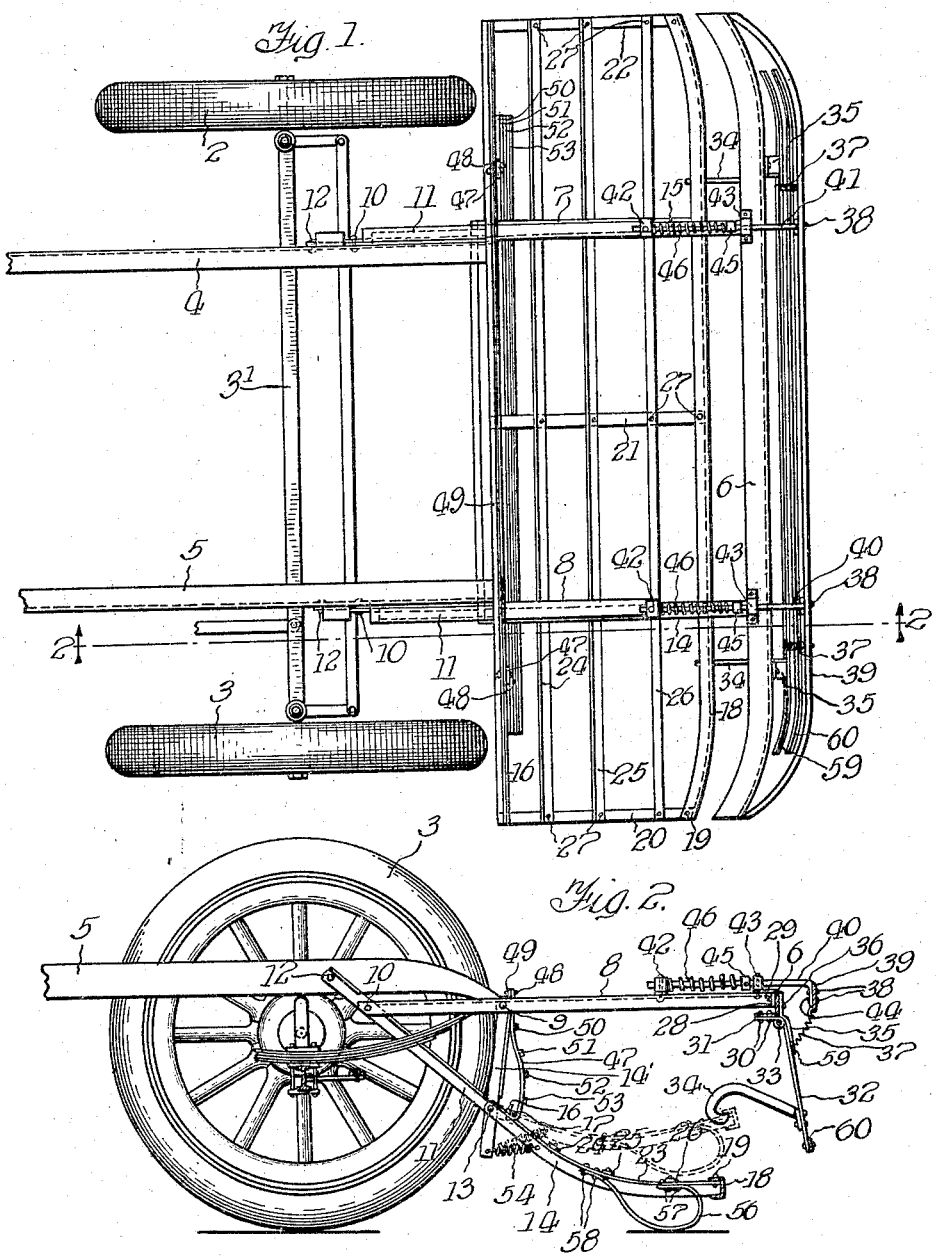
Witnesses:
R. Bauerle,
A. J. Sauser.
Inventor:
Lars C. Madsen
by Warner Dickstrom
Atty.

UNITED STATES PATENT OFFICE.

LARS C. MADSEN, OF CHICAGO, ILLINOIS.

AUTOTRUCK-FENDER.

1,228,461.  Specification of Letters Patent.  Patented June 5, 1917.

Application filed February 1, 1915. Serial No. 5,351.

*To all whom it may concern:*

Be it known that I, LARS C. MADSEN, a citizen of the United States, residing at Chicago, in the county of Cook and State of Illinois, have invented certain new and useful Improvements in Autotruck-Fenders, of which the following is a specification.

My invention relates to fenders for self propelled street vehicles and has particular reference to fenders adapted for the heavier vehicles such as trucks which move comparatively slowly and yet are comparatively dangerous on account of their weight and the greater difficulty of promptly stopping them compared with passenger cars. The objects of the invention are to produce a sufficiently sensitive mechanism for dropping down a normally raised fender; to provide several levels of contact for effecting the release; to delay the fall of a person toward the front wheels; to insure the fender being held down in operative position so as not to bounce over the person struck, and to provide a general construction and arrangement which has regard for the element of cost so as not to make an otherwise practicable fender unavailable for general use.

With these objects in view the invention consists in the novel construction, combination and arrangement of parts all as hereinafter described in detail, illustrated in the accompanying drawing and incorporated in the appended claims.

In the drawing—

Figure 1 is a plan view of a front portion of a car and my improved fender applied thereto.

Fig. 2 is a section taken on line 2—2 of Fig. 1.

In the several views 2 and 3 represent the front wheels of an auto truck, and 3' is the axle. The details of the truck are not involved in this invention. 4 and 5 are usual side frame bars or beams of the framework to which a fender may be attached. My improved fender is designed to make use of flat strips of iron or steel for filling-in strips and angle and channel irons for the frame-work of the fender and a bumper designed for my fender. The bumper is a channel iron 6 supported on the ends of angle irons 7 and 8 secured as at 9 by bolts passing through the beams 4 and 5 and the angle irons 7 and 8 intermediate of their ends. At their rear ends said angle irons are bolted as at 10 to brace bars 11 at each side, said brace bars being bolted at 12 to the beams 4 and 5 and at 13 to braces 14' which are secured by the bolt 9 to angle irons 7 and 8. The pivoted part of the fender frame is a pair of curved angle irons 14 and 15, which are identical and in each instance pivoted as in Fig. 2 on the bolt 13. The rear side of the heavier frame portions of the fender is formed by an angle iron 16 bolted as at 17 to each of the horizontal wings of the curved angle irons 14 and 15, while the front side of the fender frame is constituted by a channel iron 18 similarly secured by a bolt 19 to each iron 14 and 15. 20, 21 and 22 are additional members of the frame which have the same curvature as the members 14 and 15, parallel same as shown in Fig. 1 and are secured to the front and rear portions of the frame as at 19 and 17 in Fig. 2, where 23 represents the horizontal wing of the angle iron 14 as well as a side or edge view of each of the irons 20, 21 and 22 which are flat, or of less rigidity than the irons 14 and 15. The fender body is substantially completed by a suitable number of transverse metal strips or slats 24, 25, and 26 which are bolted or riveted to the frame members 14, 15, 20, 21, and 22 by means of bolts or rivets 27.

The channel iron bumper 6 has one of its parallel wings bolted or riveted in any suitable manner to a wing of each of the irons 7 and 8. On the other wing of each of these irons, or the vertical wing in each instance, is a lug 28, as shown in Fig. 2, and this lug is riveted at 29 to the bottom, or vertical side in Fig. 2, of the channel iron or bumper 6. To the lower of the parallel sides of the channel iron 6 is riveted as at 30 a leaf 31 of a hinge, the other leaf of which is extended into an arm 32 pivoted at 33 to the wing 31. One such arm 32 is arranged near to the vertical plane of each of the irons 14 and 15, and each arm 32 has secured thereto a hook 34 which is arranged to be engaged with the upper of the parallel wings of the angle iron 6 as indicated by the dotted line position of the fender, which is its inactive or normal position. A stop to limit the forward swing of the arm 32 is provided in a finger or short bar 35 which is riveted as at 36 to the channel iron 6. The arm 32 is held pressed against this stop by a tension spring 37 secured at one end to a bar 59 and secured at the other end at 38 to a contact bar 39. The support for the contact bar 39 is a pair of rods 40 and 41 each of which is longitudinally movable in bearing members 42 and 43 secured to the bars 7 and 8 and provided with a bent down or vertical portion 44 through which the bolts or rivets 38 pass. On each of said rods, between the bearings 42 and 43 and adjacent to the bearing 43, is secured a collar 45, which bears against one end of a compression spring 46, the opposite end of which bears against the bearing 42 and holds the contact bar normally projected a short distance in front of the bumper 6. The ends of the latter are slightly curved rearwardly, as shown in Fig. 1, and the ends of the contact bar 39 are also curved and to a sufficient extent to cause them to touch the ends of the bumper and substantially form a part thereof, such parts then being the rigid or unbending portion 6 and the flexible or yielding portion 39 mounted on the longitudinally movable and spring-pressed rods 40 and 41. Immediately in front of the wheels 2 and 3 is arranged a guard to prevent a person from rolling off the fender under the vehicle. This guard consists of a vertical strip of flexible metal 47 the upper end of which is riveted or bolted as at 48 to an angle iron 49 supported by and secured to the irons 7 and 8, while the lower end is secured to the angle iron 16 or rear side of the fender frame, one such strip 47 being arranged in front of each wheel, Fig. 2 being a vertical section of one of the identical sides. Secured to and extending between the flexible strips 47 are a series of comparatively light metal strips 50, 51, 52, and 53 which form the guard for which the strips 47 are the supports. A brace 14' is arranged at each side and projects below the brace bar 11 and below the rear ends of the pivoted angle irons 14 and 15. To the lower end of the brace 14' is secured one end of a coiled spring 54. The other end of the spring is secured to the angle iron 14, a similar spring being provided for the angle iron 15. These springs are tensioned to exert downward pull upon the fender so as to hold it in its lowered or operative position and prevent its accidental upthrow by unevenness in the road. Each of the irons 14 and 15 is provided with a shoe or runner 56, which is a metal strip bent to form and having its ends riveted at 57 and 58 to a wing of each of the irons 14 and 15. On the arms 32 are mounted a pair of strips 59 and 60, the last one, as well as the lower end of each arm 32, being arranged as low as possible, or as near the road as possible to insure contact with a small child or even animals, such as dogs and persons in a crouching or partly prostrated position. The resiliency of the upper contact bar 39 tends to relieve the shock of a blow and also tends to prevent a person from being thrown suddenly toward the wheels, while contact with either the strips 59 and 60 or the arms 32 will push the hooks 34 rearwardly and release them from the channel iron 18. Both the springs 54, which tend to hold the fender down when lowered, and the springs 37 tend to hold the hooks 34 and channel iron 18 from being jarred out of engagement with each other to accidentally lower the fender. The arrangement as a whole is designed to combine strength, efficiency and security in both operative and inoperative positions with the aid of materials that are regular market staples. The arrangement also aims at certainty of operation and a minimum distance of movement when the fender is released. The upper flange or wing of the channel iron front of the fender may be engaged with equal effectiveness at substantially any point along its length. The channel iron bumper gives it rigidity and its upper wing laid on the horizontal wings of the angle irons 7 and 8 is fastened in a simple and inexpensive manner at any convenient point by means of bolts or rivets, thus obviating here also special fastener contrivances. The contact strip 39 is both a shock absorber and a trigger which itself may be made capable of releasing the hooks 34 by reason of the sufficient forward inclination of the lower ends of the arms 32, as shown, tending to swing the arms back by gravity when the tension of the spring 37 is released. In order to reduce the length of the arc of swing, the fender is made in substantially two parts, namely, the flexible portion from the axis 13 up, represented by the strips 50 to 53 and the comparatively short pivoted portion represented by dotted lines in Fig. 2. This pivoted portion has not far to fall, while its elevation in its inoperative position is ample to safely clear all usual road obstructions. I am aware that features apparently analogous may be found in street car fenders, but their constructions are not adapted for automobile or auto truck purposes. The runners 50 guard the front edge of the fender against impinging on road obstacles and while this elevates the front of the fender a little the springs 54 act positively to hold the fender down to pick up a body and prevent the front of the fender from riding over such body. While the fender is provided with liberal "fencings" at the rear against the wheels and at the front against accidental non-operation when a body is struck, the parts employed are designed to be so simple and inexpensive that the cost will, in spite of all of these precautions, be low and the fender easily assembled without the aid of high class mechanical skill.

Having thus described my invention I claim as new and desire to secure by Letters Patent—

1. The combination with frame portions of an auto truck or the like, of angle iron supports 7 and 8, a channel iron bumper on the ends of said supports, brace rods 11 extending downwardly and forwardly from said portions and supports, a guard of strips 50 to 53 inclusive extending from said supports to said brace-rods forming a flexible fender portion, a pivoted fender portion pivoted at the lower ends of said brace rods, and a trigger mechanism mounted on said bumper and normally engaging the front of the pivoted fender portion to support the latter in a raised position.

2. The combination with a fender, of a bumper, a rearwardly yielding member facing said bumper, hooks mounted on arms and arranged below the level of said bumper which normally support said fender in a raised position, and tension devices connecting said arms with said yielding member for holding said hooks and fender in engagement with each other.

3. The combination with an auto truck of the horizontal angle iron supports 7 and 8, the channel iron bumper having one of its parallel wings secured to wings of said supports, downwardly projecting arms hinged to the other of said parallel wings of said bumper, horizontal strips on said arms which form a guard in front of said bumper, hooks on the lower ends of said arms, a fender having a flexible portion in front of the wheels of said truck and a pivotally movable portion having its axis of movement substantially on the level of said hooks, and means holding said fender's movable portion in engagement with said hooks to hold said fender's front edge in a normally raised position.

4. The combination with an auto truck, of a bumper and bumper supports 7 and 8, horizontally arranged strips forming guards depending substantially vertically below said supports and bumper immediately in front of the auto truck wheels and below said bumper, respectively, a pivotally movable fender portion pivoted at the lower extremity of the rear of said guards, and trigger means for normally supporting the front of the fender upon the front one of said guards.

5. The combination with a fender, of a bumper, a contact bar yieldingly mounted in front of said bumper, pivoted arms projecting below the horizontal plane of said bumper, tension springs connecting said arms and contact bar, means at the lower ends of said arms engaging the front of the fender and normally supporting it in a raised position, said fender being pivoted at its rear in substantially the horizontal plane of said engaging means, tension means tending to lower said fender and hold it in a lowered position, and runners on said fender guarding the front edge thereof against contact with the road.

6. The combination with a fender, of a bumper, a contact bar yieldingly mounted in front of said bumper, pivotally movable arms suspended below said bumper, pivotal supports for the rear of said fender, said supports arranged at substantially the horizontal plane of the lower ends of said arms, means on said arms for engaging the front of said fender to hold it in a normally raised position, and connecting strips between said arms which serve as contact strips adapted to actuate said arms to release their fender engaging means and permit the front of the fender to drop.

7. The combination with an auto truck, of a channel iron bumper, angle iron supports for said bumper engaging the channel in said bumper, a fender consisting of a flexible vertical portion and a pivotally movable portion, the latter having an angle and channel iron frame, and a pivoted guard depending from said bumper and provided with means for normally supporting the pivoted portion of the fender in a normally raised position.

8. The combination with a bumper and the horizontal supports therefor, of pivotal supports projected below the horizontal plane of said bumper, a guard of strips between the horizontal plane of said bumper and said pivotal supports, a fender part pivoted at the lower ends of said supports, means tending to lower said fender, pivoted arms depending from said bumper, hooks on said arms which normally engage the front of said fender part to support it in a raised position a substantial distance below the horizontal plane of said bumper, parallel contact strips mounted on said arms, and yielding tension means tending to hold said hooks in engagement with said fender.

9. The combination with a fender, of a bumper, supports projecting below the horizontal plane of said bumper to which said fender is pivoted, tension means exerting a pull upon said fender below its pivot axis, pivotally mounted guards depending from said bumper from end to end thereof, hooks on said guards normally engaging said fender to hold it in inoperative position, and means tending to hold said hooks in engagement with said fender.

10. The combination with a bumper and supports therefor, of a fender consisting of a flexible portion and a pivotally movable portion pivoted substantially to said flexible portion and forming substantially a continuation thereof to a lower operative level, pivoted arms depending from said bumper toward said lower level, hooks on said arms, a channel iron front on said pivoted fender portion arranged to have one of its parallel wings engaged by said hooks, means tending to hold said hooks in engagement with said front, and means tending to pull said fender down from its raised or inoperative to its lowered or operative position.

In testimony whereof I have hereunto set my hand in the presence of two subscribing witnesses.

LARS C. MADSEN.

Witnesses:
 LAURITZ P. PAULSON,
 CLARENCE MADSEN.